United States Patent Office 3,445,302
Patented May 20, 1969

3,445,302
METHOD FOR FABRICATING DOUBLE-DIFFUSED SEMICONDUCTIVE DEVICES

Donald C. Lepiane, Reading, Pa., assignor to Western Electric Company, Incorporated, New York, N.Y., a corporation of New York No Drawing. Filed Dec. 20, 1966, Ser. No. 603,148
Int. Cl. C23c *9/04;* H01l *3/12, 7/46*
U.S. Cl. 148—186 9 Claims

ABSTRACT OF THE DISCLOSURE

Semiconductive slices are maintained substantially flat and unbowed during double diffusion processes by diffusing impurities having similar atomic diameters into each side of the slice. In one example, phosphorus is diffused into one surface of a silicon slice, and a mixture of boron with either gallium or indium, is diffused into the other surface.

This invention relates to semiconductive devices and, more particularly, to improved methods for the double diffusion of impurities into semiconductive slices.

For the purposes of the following description and claims, the term "slice" is used to mean a thin disc that has been cut from a crystal of a semiconductive material. The term "wafer" is used to refer to a discrete body of semiconductive material that has been cut or otherwise subdivided from a slice. The phrase "double diffused slice" is used to mean a slice that has a different conductivity type determining impurity diffused into each of its faces. In ordinary practice, a double diffused slice is prepared in "double diffusion processes" wherein impurities are simultaneously diffused into both faces of the slice as by painting impurities onto the surfaces of the slice and placing the slice in a furnace at high temperatures.

In double diffusion processes, it has been observed that a slice may become bowed or curved during the time the diffusants are being diffused into the slice. The slice may be perfectly flat before being placed in a furnace, but after removal therefrom, a curvature in the slice may be observed. If the slice becomes bowed or curved during diffusion, substantial difficulties may arise in the further processing of the slice, particularly with respect to those later operations in which the slice is subdivided into a number of wafers. For example, several conventional techniques used to subdivide a slice require that the slice be mounted in a wax material that will securely hold the slice while it is being cut. Here it is important for the slice to lie flat in the wax so that it will be contacted uniformly across its entire undersurface. Also, when ultrasonic or air abrasion cutting techniques are used, if the entire bottom surface of the slice is not held in the wax, the wafers will be blown away as they are cut from the slice. In other instances, when etch cutting techniques are used to subdivide the slice, the preparation of a suitable etch-resistant mask may be considerably complicated if the surface of the slice is not flat. Still different problems may arise in manufacturing a mesa semiconductive device. In this instance, if the height of the mesa is to be held uniform on all of the wafers prepared from a single slice, the surface of the slice must be flat during the time that the mesas are being developed.

Accordingly, an object of this invention is to provide improved methods whereby double diffused semiconductive slices can be prepared without causing the slices to curve or bow.

Briefly, these and other objects of this invention are achieved by selecting as the impurities to be diffused into opposite sides of the slice, elements that have approximately equal atomic diameters. If it transpires that one of the diffusants so selected will not diffuse into the slice at a rate sufficient to provide the desired depth of diffusion, another impurity of the same conductivity type, but having a faster diffusion coefficient, will be mixed and diffused with said impurity having too low a coefficient of diffusion. The correlary proposition is also true; i.e., the impurities for opposite sides of the slice may first be selected for having the desired diffusion coefficients, and if one of the impurities so selected has an appreciably smaller atomic diameter than the other impurity, a third impurity of the same conductivity type, but having a larger atomic diameter, will be mixed and diffused with the diffusant of smaller atomic diameter.

The above method is based upon the discovery that the degree to which a slice is distorted during a double diffusion process is a function of the difference between the atomic diameters of the impurities diffused into opposite faces of the slice. It is thought that this results from the fact that the penetration of a larger diameter impurity into the crystal lattice of a slice will stress that portion of the crystal more highly than those portions where the crystal is penetrated by a smaller diameter impurity and, accordingly, that the slice will be caused to bow or curve. It follows that, in order to maintain the slice as flat as possible during the double diffusion of the impurities, no unbalanced stresses should be placed on the crystal lattice and, accordingly, the impurities to be diffused into opposite sides of the slice should be of approximately equal atomic diameters.

It is well recognized that various common impurities diffuse into a semiconductive slice at different rates. The rate at which an impurity is diffused at a given temperature into a given material is referred to as the "diffusion coefficient" and is expressed in square centimeters per second ($cm.^2$/sec.). Since, in double diffusion processes, impurities are diffused into both faces of a slice at the same time, selective control over the depth of penetration of each of the impurities is obtained by selecting a pair of impurities by reference to their diffusion coefficients. In the simplest example, when each impurity is to be diffused the same distance into the slice, both impurities should be selected to have the same diffusion coefficient.

After a pair of opposite kinds of conductivity-type determining impurities have been selected by reference to their diffusion coefficients, it may result that one of these impurities is of substantially smaller atomic diameter than the other impurity. If this is the case, the slice may warp during the double diffusion process unless a third impurity is mixed with the smaller diameter impurity. The third impurity is selected to be of the same conductivity type as the smaller diameter impurity and to have a larger atomic diameter than the smaller diameter impurity, which larger diameter more closely approximates the diameter of the larger diameter impurity.

The invention can be better understood by reference to Table I below, where in the atomic diameters and diffusion coefficients for several of the common conductivity type determining impurities are given. For example, assume that a slice is comprised of silicon and it is desired to diffuse phosphorus into one side of the slice as the n-type impurity. Further assume that the other side of the slice to be diffused to the same depth as the phosphorus with a p-type impurity. In order to make this possible, an impurity having a diffusion coefficient similar to phosphorus must be selected and, referring to the table, it can be seen that boron is such an appropriate p-type material. However, if boron and phosphorus are double diffused into the silicon slice, the slice will become bowed with the boron surface concave and the phosphorus surface convex. As mentioned above, this is believed to occur due to the fact that the diameter of the phosphorus atom is, as indicated in the table, over twice that of the boron. Due to this larger atom's being diffused into one side of the silicon crystal, the crystal becomes stressed more highly on that side than on the other and bowing will result. In accordance with the teachings of this invention, such unequal stressing of the crystal lattice on opposite faces of the slice can be avoided by selecting a second p-type impurity that has a diameter more closely approximating that of the phosphorus. Referring again to Table I, it can be seen that gallium or indium would be suitable as a second p-type impurity to mix and diffuse with the boron. Since the atomic diameter of the gallium and indium more nearly approximate the atomic diameter of the phosphorus, the development of unequal stresses within the crystal lattice of the slice is avoided. On the other hand, the use of boron will enable diffusion of a p-type impurity at approximately the same rate as that of the phosphorus. Accordingly, through the conjoint use of both p-type impurities, a flat slice can be prepared having both p- and n-type impurities diffused to approximately the same degree into the surface of their respective sides of the slice.

TABLE I

| Impurity | Diameter (Angstroms) | Diffusion Coefficient ($cm.^2$/sec.) | |
|---|---|---|---|
| | | Silicon | Germanium |
| n-type: | | | |
| Phosphorus | 2.2 | 10.5 | $12.3\times10^9$ |
| Arsenic | 0.96 | 0.3 | $12.7\times10^9$ |
| Antimony | 1.19 | 5.6 | $6.9\times10^9$ |
| p-type: | | | |
| Boron | 1.0 | 10.5 | $1.8\times10^9$ |
| Gallium | 2.7 | 3.6 | 20.0 |
| Indium | 1.65 | 16.5 | $0.5\times10^9$ |

The ratio of the quantity of the first p-type impurity to the second p-type impurity can best be determined by experimentation. It will be appreciated that if the ratio of the large diameter impurity to the small diameter impurity is too great, the depth of diffusion of the small diameter p-type impurity into the slice may not be sufficient. On the other hand, if the material having a high diffusion coefficient and a small atomic diameter is used in overabundance, the slice will bow. Thus, in any given instance, the optimum ratio between the p-type impurities will result in a slight compromise between the two properties desired in the slice, but this ratio can readily be determined by anyone skilled in the art with the above description in mind.

The table that has been given above is based upon the more common n- and p-type impurities. However, it is within the scope of this invention to select other n-type and p-type impurities, it being necessary only to determine the atomic diameter and the diffusion coefficient of the impurities. In the above hypothetical illustration, boron was selected for use with phosphorus due to the fact that their diffusion coefficients are almost equal. It must be understood that on some occasions it is not desired to have both diffusants penetrate a similar distance into the surface of the slice, and p- and n-type impurities having different diffusion coefficients should then be selected.

EXAMPLES

To demonstrate the efficacy of the method of this invention, certain test data were obtained by preparing a series of double diffused slices under varying conditions. The results are listed in Table II below.

In all of the examples, a suitable slice, approximately 1¹⁄₁₆ inches in diameter, was prepared from a silicon crystal. In each instance one surface of the slice was painted with a donor solution comprised of a mixture of 4 grams of phosphorus pentoxide in 80 milliliters of ethylene glycol monomethyl ether. The other surface of the slice was painted with an acceptor solution comprised of a mixture of p-type materials, of a kind and quantity as shown in Table II, in 100 milliliters of ethylene glycol monomethyl ether.

After both surfaces of each slice had been painted, the slices were placed in a furnace for about 16 hours at a temperature of about 1300° C. After the slices were removed from the furnace and cooled, the amount of bowing and penetration were measured and the results are recorded in Table II.

The bowing of the slices was measured by utilizing a Unitron microscope equipped with a depth measuring gauge calibrated to be read in mils. The treated slice was first placed upon the microscope platform with the phosphorus-diffused side uppermost, the microscope was focused, and the calibration was set at zero. The slice was then reversed with the p-type-diffused side uppermost, and the change in the focal distance was noted.

TABLE II

| Example | P-type Impurity | Slice Bowing | Depth of Diffusion of P-ty Impurity |
|---|---|---|---|
| I | 20 grams boric acid | 6 | Satisfactory. |
| II | 5 grams $Ga_2O_3$ | (1) | Insufficient. |
| III | 4 grams boric acid + 4 grams $GA_2O_3$. | 3 | Satisfactory. |
| IV | 2.5 grams boric acid + 4 grams $GA_2O_3$; | <1 | Do. |

1 <1 in reverse direction.

From the above, it can be appreciated that by suitably adjusting the percentage of the several p-type impurities used, the amount of bowing can be controlled within acceptable limits and the desired depth of diffusion can be obtained. Generally, a slice will be acceptable if the bowing of a slice can be controlled to be less than about 3 mils.

Although certain embodiments of the invention have been described in the specification, it is to be understood that the invention is not limited thereto, is capable of modification, and can be rearranged without departing from the spirit and scope of the invention.

What is claimed is:

1. A method for the double diffusion of conductivity type determining impurities into a semiconductive slice comprising the steps of:
   - contacting one surface of said slice with a first conductivity type determining impurity;
   - contacting the other surface of said slice with a second and a third conductivity type determining impurity of opposite kind from said first impurity, said second impurity selected for having a desired diffusion coefficient and said third impurity having an atomic diameter approximating the atomic diameter of said first impurity; and
   - heating said slice and diffusing said impurities thereinto.

2. A method according to claim 1, in which said first impurity is an n-type impurity.

3. A method according to claim 2, in which said second and said third impurities are p-type impurities.

4. A method according to claim 2, in which said first impurity is phosphorus.

5. A method according to claim 4, in which said second impurity is boron.

6. A method according to claim 5, in which said third impurity is selected from a group consisting of gallium and indium.

7. A method according to claim 6, in which said slice is a silicon slice.

8. A method for the preparation of a double diffused silicon slice comprising the steps of:
   - contacting one side of said slice with an n-type impurity;
   - contacting said other side of said slice with a plurality of p-type impurities, one of said impurities being boron and the other said impurities being selected from the group consisting of gallium and indium; placing said slice in a high temperature environment and diffusing said impurities into said slice.

9. A method for the preparation of a double diffused semiconductive slice in which boron is diffused into one surface of said slice and an n-type impurity is diffused into the other side of said slice, the improvement comprising diffusing a second p-type impurity along with said boron into said first side of said slice, which additional impurity has an atomic diameter approximating the atomic diameter of said n-type determining impurity.

References Cited

UNITED STATES PATENTS

| | | | |
|---|---|---|---|
| 2,974,073 | 3/1961 | Armstrong | 148—188 |
| 3,145,126 | 8/1964 | Hardy | 148—187 |

L. DEWAYNE RUTLEDGE, *Primary Examiner.*

R. A. LESTER, *Assistant Examiner.*

U.S. Cl. X.R.

29—576; 148—188, 189, 190